US007054015B1

(12) United States Patent
Ganji

(10) Patent No.: US 7,054,015 B1
(45) Date of Patent: May 30, 2006

(54) PRINTER DESCRIPTION FILE FORMAT GENERATOR

(75) Inventor: Saeed Ganji, Union City, CA (US)

(73) Assignee: Electronics For Imaging, Inc., Foster City, CA (US)

( * ) Notice: Subject to any disclaimer, the term of this patent is extended or adjusted under 35 U.S.C. 154(b) by 708 days.

(21) Appl. No.: 09/346,354

(22) Filed: Jul. 2, 1999

(51) Int. Cl.
*G06F 15/00* (2006.01)

(52) U.S. Cl. ..................................... 358/1.13; 358/1.15

(58) Field of Classification Search .............. 358/1.12, 358/1.13, 1.15, 1.16, 1.1–1.9, 1.11, 1.14, 358/1.17, 1.18; 717/7
See application file for complete search history.

(56) References Cited

U.S. PATENT DOCUMENTS

| | | | |
|---|---|---|---|
| 5,467,435 A | 11/1995 | Douglas et al. | 395/114 |
| 5,469,533 A | 11/1995 | Dennis | 395/114 |
| 5,471,563 A | 11/1995 | Dennis et al. | 395/114 |
| 5,488,458 A | 1/1996 | Benedict et al. | 355/206 |
| 5,559,933 A | 9/1996 | Boswell | 395/114 |
| 5,566,278 A * | 10/1996 | Patel et al. | 358/1.15 |
| 5,625,757 A | 4/1997 | Kageyama et al. | 395/113 |
| 5,699,494 A | 12/1997 | Colbert et al. | 395/114 |
| 5,713,032 A * | 1/1998 | Spencer | 395/777 |
| 5,754,858 A | 5/1998 | Broman et al. | 395/701 |
| 5,768,564 A * | 6/1998 | Andrews et al. | 395/500 |
| 5,857,064 A * | 1/1999 | DeSilva | 358/1.13 |
| 5,993,088 A * | 11/1999 | Nogay et al. | 400/78 |
| 5,995,724 A * | 11/1999 | Mikkelsen et al. | 358/1.16 |
| 6,049,390 A * | 4/2000 | Notredame et al. | 358/1.15 |
| 6,134,018 A * | 10/2000 | Dziesietnik et al. | 358/1.15 |

FOREIGN PATENT DOCUMENTS

| | | |
|---|---|---|
| EP | 0578257 | 1/1994 |
| EP | 0578258 | 1/1994 |
| EP | 0578263 | 1/1994 |
| EP | 0740455 | 10/1996 |
| EP | 0741488 | 11/1996 |
| EP | 0441896 | 5/1997 |
| EP | 809176 | 11/1997 |

OTHER PUBLICATIONS

Richard M. Stallman and Roland McGrath, *GNU Make, Aprogram for Directing Recompilation*, May 1998, GNU make Version 3.77.

*Generating Multi-Plat form Build Logic from Common Source Code*, Sep. 1997, IBM technical Disclosure Bulletin, vol. 40, No. 9.

*PostScript Printer Description file Format Specification*, Feb. 9, 1996, Adobe Developer Support.

Jacqueline Floch, *Supporting Evolution and Maintenance by Using a Flexible Automatic Code Generator*, Apr. 23, 1995, Proceedings of the Annual Conference on Software Engineering.

* cited by examiner

*Primary Examiner*—King Y. Poon

(57) ABSTRACT

The conventional generation of original and design-change PPD files for printer drivers is tedious and prone to error as each version for a language-platform combination is constructed. The invention generates all the necessary PPD files for any needed platform/language combination from one or more base PPDs and one or more build files. A PPD generator draws on the information contained in the base PPD and build files to construct all the combinational varieties needed to support different languages and platforms, while providing an efficient and flexible environment for doing so.

5 Claims, 2 Drawing Sheets

Functional overview of the invention

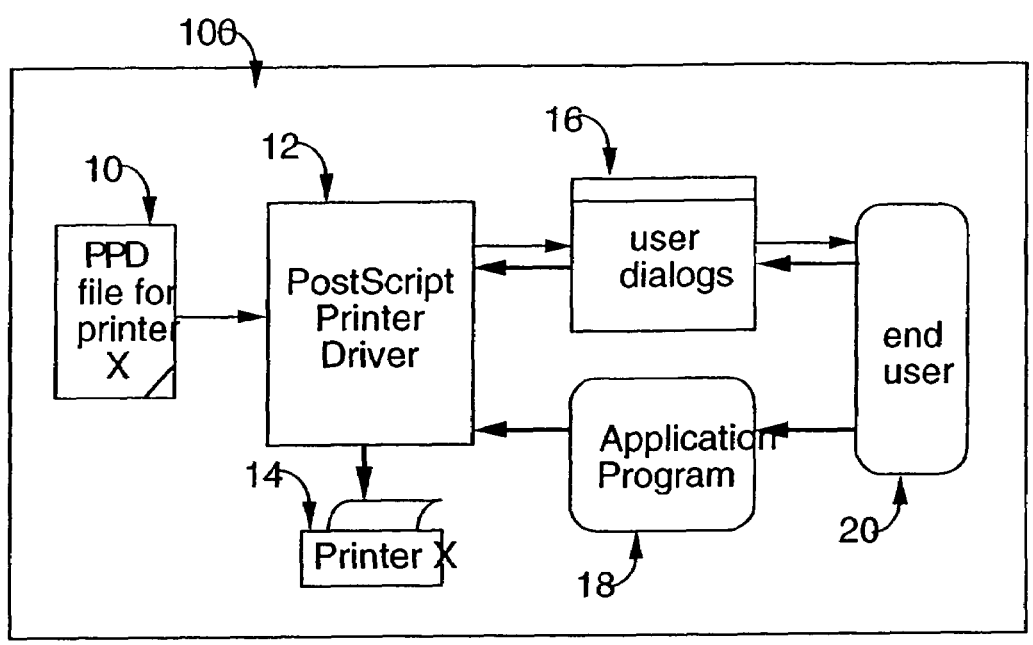
Figure 1: Original application environment

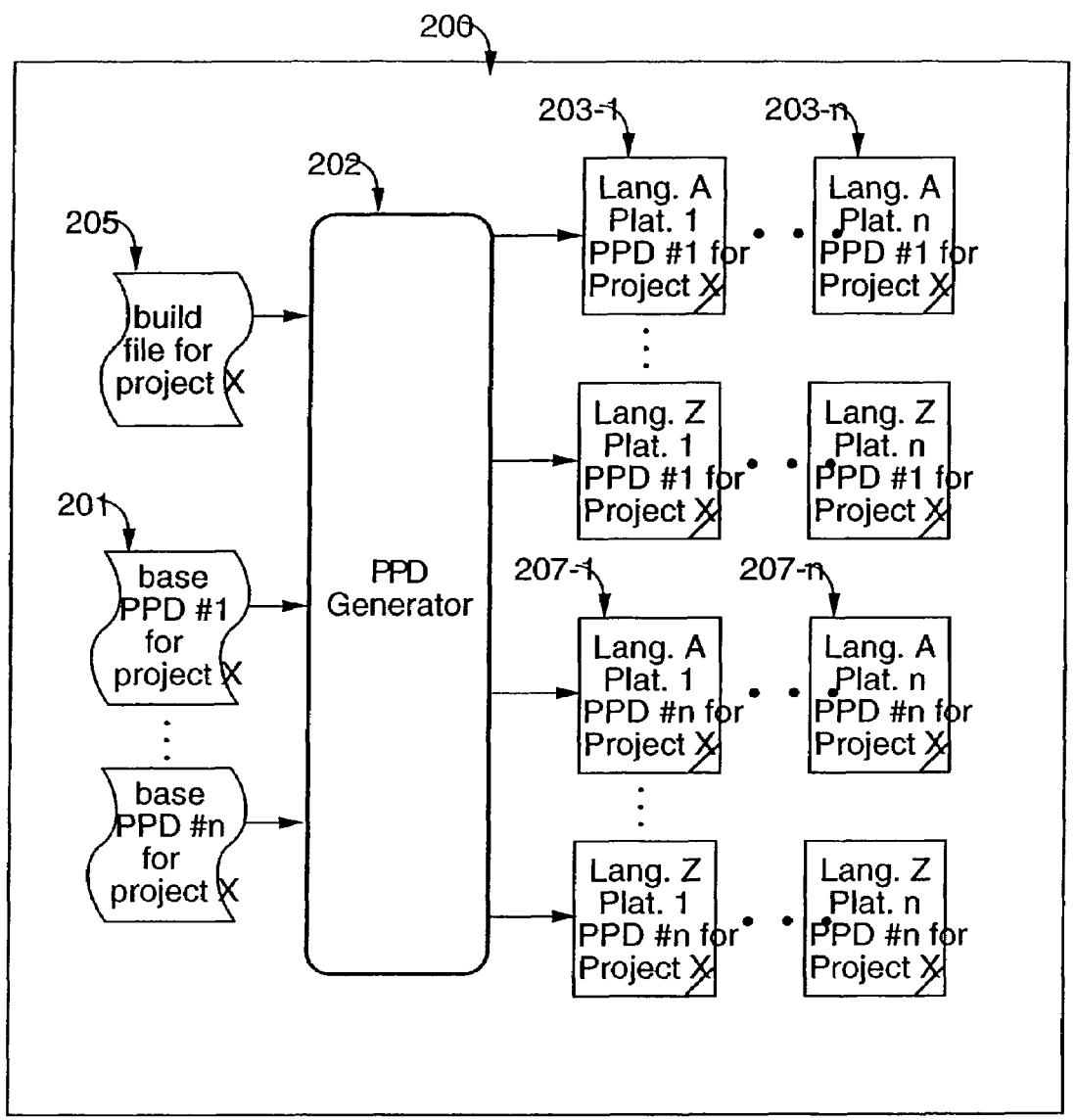
Figure 2: Functional overview of the invention

PRINTER DESCRIPTION FILE FORMAT GENERATOR

BACKGROUND OF THE INVENTION

1. Technical Field

The invention relates to PostScript® Printer Description (PPD) files and more particularly to computer processes and systems for generating PPD files for printers.

2. Description of the Prior Art

A PostScript® Printer Description (PPD) file is a text file that describes the printer features unique to particular printers in particular environments to the PostScript® Printer Driver(s) available for that environment. Ubiquitous PostScript® printer driver executable program files are used to provide communications between an application program and PostScript®-enabled printers residing on the network. Each PPD file contains certain phrases that describe what a particular printer is capable of doing. PPD files are commonly created by manufacturers of PostScript® printers. The driver is created either by Adobe Systems, Inc., the creators of PostScript® language, or by provider of the particular operating system the user is using (whether it be Microsoft corporation in case of Windows or Apple Computers in case of Macintosh), or it is sometimes provided by manufacturers of different application programs that a user may be using.

A PPD file is not a printer driver. It is an information file, in ASCII format, that is used by a printer driver loaded by an operating system or application program. Because PPDs are all written in ASCII-text format, they are not limited to a specific software environment or platform. An ASCII-text PPD file can therefore be used equally well in Windows, MAC-OS, and UNIX environments, and by a variety of software applications. Adobe Systems, Inc. (Sunnyvale, Calif.) has defined how PPD files must be constructed by printer and software vendors in the "PPD Specification," now at version 4.3.

In general, a PPD file contains information that describe the capabilities of a particular printer to a printer driver. The driver then communicates some of this information to the end-user and allows him to choose certain features suited to the file being printed. For example, if the printer in question is color capable, has duplexing (ability to print to both sides of the page), and supports paper sizes Letter, Legal, and Tabloid, then printer drivers having access to this PPD are capable of providing this information to user using common user interface features such as popup menus and radio buttons. The user then selects a combination of the features available on that particular printer to be used when the data is at some point being printed. For example, a user may choose to print a certain word processing document to a letter-size page in back and white mode while the same or another user may decide to print another file containing graphics to a tabloid-size page in color.

It is an unfortunate fact for the manufacturer of PPDs that all PostScript printer drivers that claim to conform to the Adobe PPD Specifications often do not behave in exact manners when using a PPD. There are several gray area situations in which a PPD file that works correctly for one printer driver, may fail in part when used by another driver. As a result, a manufacturer of PPDs has to provide several PPD files that are each suited for a particular environment so that a majority of potential users can take advantage of their benefits. One such situation arises with PPD files for languages other than English. Since PPD files contain strings used in user-interface dialogs, these strings need to be translated for all supported languages. The way different drivers interpret non-English characters, such as "graves", "acutes" and "umlates", are different on different platforms. So a French PPD for the Macintosh platform is different than a PPD for Windows 3.1 at least when it comes to these strings. These PPDs may also be different due to technical reasons determined by the printer/PPD miter. For example, the manufacturer may decide that a certain feature is to be supported only on Windows 95/98 platforms but not on Windows NT.

The conventional method of generating PPD files for different platforms and languages involves a significant amount of manual typing or "copy and paste" operations. This is an overwhelming task. Let us assume that at some point during the development of a printer, an engineer working for the printer manufacturing company is assigned the task of adding support for a new pagesize, A4, to all the PPDs pertaining to that product. The challenge is two-fold. First of all, he must come up with the ASCII text segments that must be added or changed in the existing PPD. Secondly, he must make these changes to every PPD the company is shipping for that printer. If the product line supports three languages and four platforms, he is faced with the daunting task of editing twelve (3 languages×4 platforms) files. The conventional method, therefore, can be described as time-consuming and prone to human errors as each revision for a language-platform combination is constructed.

It would be advantageous to provide a system that generates all the necessary PPD files for all platforms and languages from a single source.

SUMMARY OF THE INVENTION

The invention provides a PPD generator that generates all the necessary PPD files for all supported platforms and languages for the print engines in a particular manufacturers product line from one or more base PPDs. The PPD generator uses an associated build file that contains information as to how the base PPDs are to be edited for all the supported languages, as well as exceptions to standard features attendant with a particular target platform/language.

The PPD generator includes the following components: First, there is an initial setup section where several flags, or variables, are set to initial values that are used during the PPD generation process. Secondly, there is a routine set of procedures that are performed on almost all PPDs with small variations based on the initial flag values. Thirdly, there is a component that uses information contained in the build file to change further and shape some of the generated PPDs based on unique criteria that are specific to that particular product line's PPDS.

The invention enables maximum flexibility because an engineer can provide specific information regarding the needed changes for each platform, and it is only necessary, in most situations, to work on the single base PPD for each new revision after the build file is first created. Thus, the invention saves a significant amount of time that would otherwise be used to perform cut-and-paste operations, it minimizes the potential for human errors, it takes very little time to setup in most cases, and it provides an expansive method of customizing any number of PPDs based on the specific needs of a particular protect.

Table I illustrates how the number of PPD files that need to be supplied for each printer or application program can proliferate. A different PPD file is needed in each user application environment.

TABLE I

Typical PPD File Constellation

| | Mac | PC | UNIX |
|---|---|---|---|
| English | English-Mac | English-PC | English-UNIX |
| French | French-Mac | French-PC | French-UNIX |
| German | German-Mac | German-PC | German-UNIX |
| Japanese | Japanese-Mac | Japanese-PC | Japanese-UNIX |

The reason that natural languages must be involved is that a printer driver must ask a user what printer features are to be selected. To do this, various spaces in conventional windows-type dialog boxes are presented on the computer screen. These spaces must be painted with an appropriate phrase scripted in the user's language. For example, it is very common for a printer driver literally to ask a user if letter, legal, A4, or tabloid paper sizes are to be used in a print job. The users selection is made by pressing a radio button in the dialog box, and this choice is used to setup the preferences for the printer.

The words or phrases, letter, legal, A4, or tabloid are supplied by the base PPD 201. The fact that such paper sizes can each be selected at all is also supplied by the base PPD. The computer platform for the operating system matters because some platforms cannot support particular features of the printer that other platforms can. Because the base PPD is a text file, and not executable code, the platform differences appear only as PostScript® and text string differences.

Each base PPD comprises a text file of instructions and user strings that can be translated. One object of the invention is to provide a PPD generator to translate such portions.

BRIEF DESCRIPTION OF THE DRAWINGS

FIG. 1 is a block diagram that shows the interaction between the PPD, the PostScript printer driver, the printer, and the user; and FIG. 2 is a functional block diagram that shows how the base PPD and the build file interact with the PPD generator to create all the PPD files necessary to the project.

DETAILED DESCRIPTION OF THE INVENTION

FIG. 1 is a block diagram that shows the interaction between a PPD, a PostScript printer driver, a printer, and an end user. In such system 100, the end user 20 operates a computer that is running a particular application program 18, such as Microsoft Word or Adobe PhotoShop. When the user wants to print from the program, a print file is sent to the PostScript printer driver 12. The PostScript printer driver accesses a PPD file 10 which describes the capabilities of a particular printer 14 to the printer driver. The driver then communicates some of this information to the end-user and, as a result of a user dialog 14, allows him to choose certain features suited to the file being printed. The user then selects a combination of the features available on that particular printer to be used when the data are at some point being printed.

FIG. 2 is a functional block diagram that shows how a base PPD and a build file interact with a PPD generator in the system 200 to create all the PPD files necessary for a project. For purposes of the discussion herein, a project is a PPD file for a specific language/platform combination, e.g. French and Unix. In the preferred embodiment of the invention, one or more base PPDs 201 are provided, where a base PPD is provided for each print engine in a particular manufacturers product platform. For example, for the Xerox ZX Fiery product, a separate base PPD is provided for the 5750 and 5760 copier models. For purposes of the discussion herein, a base PPD is best thought of as a quasi-PPD file that is used as a template during the PPD generation process.

The base PPD essentially mimics the PPD for one particular language and platform combination, for example, English-Macintosh. Thus, the original design is expressed only once in the base PPDs using the English-Macintosh version. This one parent or source is used by the PPD generator 202 in the automatic generation of all the other PPDs, e.g. for all other language/platform combinations 203-1 to 203-*n* and 207-1 to 207-*n*. Thus, the conventional method of manually constructing each combinational PPD file is entirely avoided.

In the preferred embodiment of the invention, each base PPD is a text file that includes PostScript® phrases and corresponding dialog window text strings that are related to particular features and user choices for a printer. The exact construction of a PPD file is described by Adobe Systems, inc. (Sunnyvale, Calif.) in their widely circulated publication titled, PPD Specification, now at version 4.3.

The base PPD provides the generic framework needed to generate all PPD file varieties for a particular printer. Such PPD frameworks have components that must be tailored for the kind of platforms used and the natural language that users must see in page setup and printer setup dialog boxes. For example, the kids of platforms can include WINDOWS, MacOS, UNIX, and OS/2. The kinds of languages can include, for example, English, French, German, and Japanese. Each such combination of platform and language is represented collectively by a project PPD file 203-1 to 203-*n* and 207-1 to 207-*n*. The PPD generator 202 is a generation engine that contains a routine set of operations that are found in all PPDs for all language and platform combinations.

The invention also includes a build file 205 which (in the presently preferred embodiment of the invention) includes a single line for each base PPD that tells the PPD generator which languages must be created for converting that particular base PPD into all the varieties represented by the target PPD files 203-1 to 203-*n* and 207-1 to 207-*n*. The build file is used primarily to take care of platform specific issues. For example, if for some reason it is desired that the Windows 95 translation be different than all of the rest, a section is added to the build the that expresses that difference. The actual information that is necessary for a language transaction, e.g. where an English word in a print dialog should be replaced by a French, is part of the PPD generator. For example, the build file may specify that the Xerox 5750 PPDs are to include French, while the Xerox 5760 PPDs are to include Italian. The actual translation files are not unique to a particular product line and are executed as part of the PPD generator.

Furthermore, if two different printer manufacturers want different translation strings to be used for the same English word, for example, where the English string "Plain papers" is translated for one OEM as "Papier normal" and for another as "Papier ordinaire," one of the settings in the initial setup may be a variable named, e.g. OEMVersion. Based on that setting, a ton file in the PPD generator behaves differently for each printer manufacturer by using if statements. Thus, in this embodiment of the invention the initial settings are:

Set OEMVersion "Xerox."

When the actual translation scripts are running, and it is time for the English$_{13}$ to_French script, the translation scripts have a line, such as:

if {OEMVersion}=="Xerox"

translate "Plain paper" this way elseif (OEMVersion)=="Canon"

translate "Plain paper" this other way else translate "Plain paper" that way end Design changes and bug fixes are accommodated by changing the base PPD files and then running the PPD generator so that it generates a new group of PPD files for all platform/language combinations. The build file is used to identify a particular product's peculiarities to the PPD generator and to instruct the PPD generator with regard to these peculiarities. Thus, the PPD generator applies a default set of translation to the base PPDs, while the build file identifies both normal operations, such as language translations, and specific exceptions to the default that must be taken into account for the project PPD. The PPD generator produces the project PPD as a result of its interaction with both the base PPDs and the build file.

Note: In the preferred embodiment of the invention, there is only one build file for each project (i.e. Xerox ZX). Each base PPD has its own section in that projects build file. However, each PPD may alternatively have an associated build file in other embodiments of the invention.

A base PPD file may be used for a virtually unlimited number of projects, where such projects can exist simultaneously for mass-marketed products, such as printers. Typically, only one set of base PPDs exists at the original equipment manufacturer's location. Key to the invention is the fact that a base PPD may be specified for any number of target projects and that a build file may be provided for project specific exceptions to a default conversion. Thus, the system assumes certain generic functions are to be provided for all PPDs that are generated, but these functions are easily reverted or changed, based upon specific project requirements. Further, system revisions are readily propagated throughout a product line to each language/platform combination by the simple expedient of changing the base PPDs and build file as appropriate. This avoids the need to rebuild each PPD manually for each project and language/platform combination.

Table II represents an English-language type PPD file. Table III represents a corresponding French-language type PPD file for the same printer.

TABLE II

English-Language PPD

*OpenUI *EFCompression/Compression :PickOne
*OrderDependency: 05.0 AnySetup *EFCompression
*DefaultEFCompression: SCDefault
*EFCompression SCDefault/Printer's Default: ""
*EFCompression False/Off: " userdict /XJXsetRenderType known
   { (ADOBE) XJXsetRenderType }
   if "
*End
*EFCompression True/On: " userdict /XJXsetRenderType known
   { (AREND) XJXsetRenderType }

TABLE II-continued

English-Language PPD if "
*End
*CloseUI: *EFCompression

TABLE III

French-Language PPD

*OpenUI *EFCompression/Compression :PickOne
*OrderDependency: 05.0 AnySetup*EFCompression
*DefaultEFCompression: SCDefault
*EFCompression SCDefault/Imprimante par defaut: ""
*EFCompression False/Non: " userdict /XJXsetRenderType known
   { (ADOBE) XJXsetRenderType }
   if "*
*End
*EFCompression True/Oui: " userdict /XJXsetRenderType known
   { (AREND) XJXsetRenderType }
   if "
*End
*CloseUI: *EFCompression All the text stings in between a slash and colon pair are translated using automated scripts in the PPD generator. For example, in Table II, line 3, "Printers Default" in English is replaced in Table III, line 3, by the French "Imprimante par default." Also, in Table II, line 7, "On" in English is replaced In Table III, line 7, by the French "Oui". These text strings are output to the user in a dialog by printer driver 12 (FIG. 1). The base PPD has only one of the necessary strings, all the others are translated by lookup files in the build file 205. Each time there is to be a design change, e.g. to add a new printer feature or modify an existing one, all the PPD files 203-1 to 203-$n$ and 207-1 to 207-$n$ for all the different languages and platforms are automatically generated by the PPD generator using the base PPDs and the build file. This is much faster in the manufacturing environment than trying to do a manual copy-and-paste operation one-at-a-time on each of PPD files.

The build file for each project describes the build required for a particular printer to a main script in the PPD generator, e.g. a Canon versus a Xerox. The PPD generator opens the build file and searches for particular strings in the build file. If it finds them, then it knows something has to be done. Otherwise, it assumes nothing special needs to take place for that particular project. For example, Table IV is a portion of a build file.

TABLE IV

== new Mac only modifications
find *
replace /"*OpenUI *InputSlotRest"/:/"*CloseUI: *InputSlotRest"/   ""
find *
replace /"*OpenUI *InputSlotFirst"/:/"*CloseUI: *InputSlotFirst"/   ""
== end modifications The PPD generator searches the build file for "== new Mac only modifications". If found, it executes everything between that and "== end modifications".

In the above example, there are two "find the top of file" commands and two replace commands. One command replaces everything between "*OpenUI *InputSlotRest" and "*CloseUI: *InputSlotRest" with a blank (deleting them), and the next replace command similarly provides a delete function.

The input to the system is a base PPD file. This is usually the Macintosh-English PPD, or a file that closely resembles the Mac/English PPD. The purpose is to translate the base PPD to different languages and also different platforms as needed by the project. Along with the needed base PPD(s), there is also the build file that contains information, parsable by the PPD generator, as to how the required project PPD(s) is different from a standard PPD generated solely based on default methods built into the generator. For example, assume we have a Xerox and then a Canon PPD. The build file in each case instructs the scripting system how to go about doing each particular product's PPDs. The Xerox PPD may ship only for English and French languages, but the Canon may include also Italian and Japanese, and may also have other differences.

Pseudo-code is used in Table V to state the operation in a way that resembles high level programming language.

TABLE V

```
for each PPD in the "original PPD's" folder
    find the section in the build file corresponding to this PPD
    for each language from the build file for this PPD
    # start with Mac PPD
        duplicate the PPD to "Macintosh: {language}:" folder
        perform the English->{language} translations
    # time to do windows PPD's, starting with Win31
        duplicate the Mac PPD to "{Language}:Win31:" folder
    perform Mac->win31 operations
    # now windows 95/98
        Duplicate the Win31 PPD to win95 folder
        perform Win31->win95 operations
    # repeat with win_nt_4.0 and win_nt_3.5 and if
    # needed (from the build file), also the OS/2 PPD's
        # here we look perform platform specific changes
        for each platform
            search build file for platform specific changes
            if found, perform these operations on needed PPDs
        end for each platform
    end of for each language
end of for each PPD
```

Although the present invention is described herein with reference to the preferred embodiment, one skilled in the art will readily appreciate that other applications may be substituted for those set forth herein without departing from the spirit and scope of the present invention. Accordingly, the present invention should only be limited by the claims included below.

The invention claimed is:

1. A system for producing a PostScript® printer description (PPD) text file associated with a printer, the system comprising:
   a base PPD text file that comprises information regarding the printer, the information including text in a first language, the base PPD text file adapted for a first software platform; and
   a PPD generator adapted to import the base PPD text file and to generate therefrom a second PPD text file that includes text translated from the first language to a second language.

2. The system of claim 1, further comprising a build file that describes a product or platform specific set of features of the base PPD text file.

3. The system of claim 1, wherein the PPD generator parses the base PPD text file and the build file into text based instructions that may be parsed and assembled by PostScript® printer drivers.

4. The system of claim 1, wherein the PPD generator generates the second PPD file that is adapted for a second software platform.

5. A method for generating a PostScript® printer description (PPD) text file associated with a printer, the method comprising:
   providing a base PPD text file that comprises information regarding the printer, the information including text in a first language, the base PPD text file adapted for a first software platform;
   providing a build file that comprises information as to how the base PPD text file should be edited to provide a second PPD text file that includes text translated from the first language to a second language; and
   providing the build to a PPD generator to automatically generate the second PPD text file.

* * * * *